(12) United States Patent
Eguchi

(10) Patent No.: US 6,452,888 B1
(45) Date of Patent: Sep. 17, 2002

(54) DISK DEVICE

(75) Inventor: Takaharu Eguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/554,662

(22) PCT Filed: Sep. 29, 1998

(86) PCT No.: PCT/JP98/04386

§ 371 (c)(1),
(2), (4) Date: May 18, 2000

(87) PCT Pub. No.: WO00/19425

PCT Pub. Date: Apr. 6, 2000

(51) Int. Cl.[7] ............................................. G11B 33/02
(52) U.S. Cl. .................................................. 369/77.1
(58) Field of Search .............................. 369/77.1, 75.2, 369/204; 360/99.02, 99.06

(56) References Cited

U.S. PATENT DOCUMENTS 5,764,612 A * 6/1998 Tanaka et al. ............. 369/75.2

FOREIGN PATENT DOCUMENTS

| JP | 5-234209 | 9/1993 |
| JP | 6-4460 | 2/1994 |

* cited by examiner

Primary Examiner—Robert S. Tupper
Assistant Examiner—Julie Anne Watko
(74) Attorney, Agent, or Firm—Sughrue Mion, PLLC

(57) ABSTRACT

When ejecting or loading disk D of differing diameters, a device is provided which comprises a lever stopper 56 which engages with and rotates with a disk stopper 54 which displaces in the direction of disk loading by abutting with the disk D, and a cam stopper 57 which engages with and rotates in synchrony with a lever stopper 56, which is pushed by the rotating lever open member 51 above, which releases the engagement above and which becomes relatively displaceable.

2 Claims, 17 Drawing Sheets

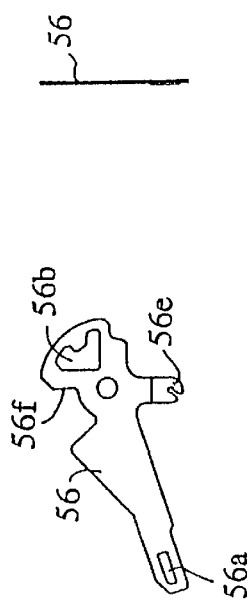
FIG. 13d
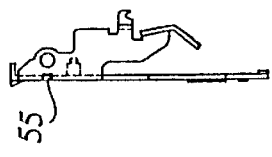
FIG. 13h
FIG. 13b
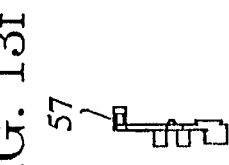
FIG. 13f
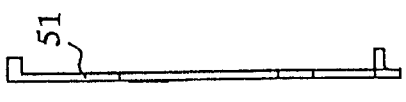
FIG. 13j
FIG. 13c
FIG. 13g
FIG. 13a
FIG. 13e
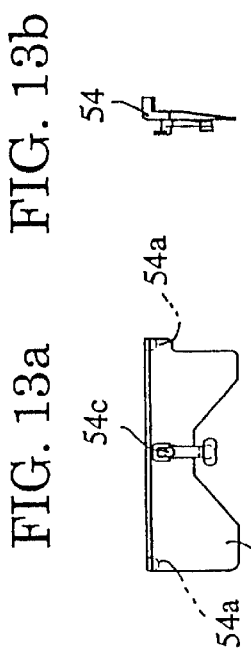
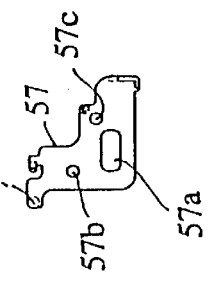
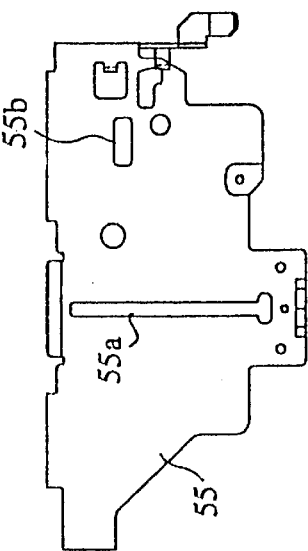
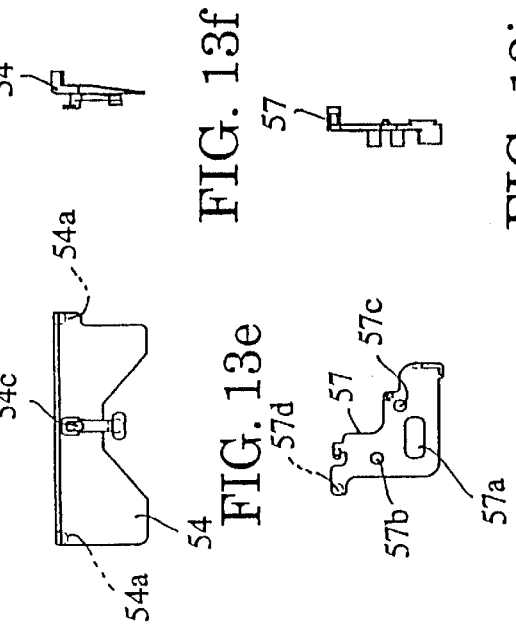
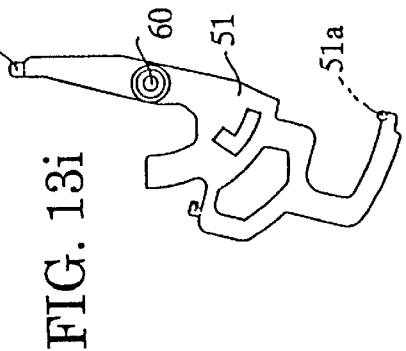
FIG. 13i

DISK DEVICE

FIELD OF THE INVENTION

The present invention relates to a disk device which loads two types (large and small) of disk onto a turntable of a playing unit (floating deck) and which expels (ejects) the disk from the turntable.

PRIOR ART

FIG. 1 is a schematic view of a disk device mounted in a vehicle. In FIG. 1, reference numeral 1 denotes a disk device, 2 is a chassis (frame) which is disposed in a vehicle, 3 is a playing unit which rotates a turntable and reads information recorded on the disk D which is mounted on the turntable. 4 is a conveying unit which inserts the disk D from the disk insertion aperture formed in the chassis into the chassis, which conveys the disk to the turntable of the playing unit 3, which conveys a disk from the top of the turntable to the disk insertion aperture and which ejects the disk outside the chassis 2. 5 is a flexible member such as an oil clamper which prevents the transmission of vibrations from the vehicle to the playing unit which a disk D is being played and which is disposed between the chassis 2 and the playing unit 3.

In the playing unit 3, 11 is a playing unit base which stores a motor or the like for the purpose of driving the motor or pickup which rotates the turntable. 11a is a rotation shaft of a pressuring arm (arm clamper) and which is provided on the playing unit base 11. 12 is a turntable which rotates the mounted disk D and which is provided on the playing unit base 11. 13 is a pressuring arm which rotates about the rotational shaft 11a, provided on the playing unit base, in the direction a-b.

14 is a disk clamp which grips the disk D with the turntable 12 by rotating the pressuring arm 13 towards the turntable 12 and which is mounted on the pressuring arm 13. 15 is a pickup which reads information recorded on the disk D and which is provided on the playing unit base 11.

In the conveying unit 4, 21 is a disk guiding section which is secured onto the upper plate of the chassis 2. 22 is a conveying roller which grips a disk D, which is inserted into the chassis 2 from the disk insertion aperture, with the disk guiding section 21, which conveys a disk D to the playing unit 3 by rotating in a positive direction while a disk D is gripped, which grips a disk D which has been conveyed to the playing unit 3 with the disk guiding section 21, and which conveys a disk D to the disk insertion aperture by rotating in the opposite direction while a disk D is gripped and which ejects a disk D outside the chassis.

In FIG. 1, the pressuring arm 13 which is provided on the playing unit 3 and the conveying roller 22 which is provided on the conveying unit 4 are driven by sliding displacement in the direction of disk ejection and direction of disk insertion. The fixation and release of the playing unit 3 are performed by a cam plate. These operations are not shown in the figures and their explanation will be omitted below.

The operation of the invention will now be explained.

Disk Loading

When a disk D is inserted into the chassis 2 from the disk insertion mouth, the disk D is gripped by the disk guiding section 21. The disk is conveyed to the playing unit 3 by the rotations of the conveying roller 22. A disk D which has been conveyed to the playing unit 3 is gripped by the turntable 12 and the disk clamp 14 due to the pressuring arm is rotating towards the turntable 12 and is loaded onto the turntable 12. At this time, the conveying roller 22 displaces to a position away from the disk D due to a cam plate (not shown). As a result, the fixation of the playing unit base 11 (which had been fixed) is released, the playing unit base 11 is supported by the flexible member 5 and the information recorded on the disk D is read. That is to say, the disk D is placed into a playable state.

Disk Playing

The playing of the disk D, which is mounted in a stationary position on the turntable 12, is initiated by the turntable 12 rotating. The information recorded on the disk D is read by the pickup 15. At this time, the vibrations of the vehicle are absorbed by the flexible member 5 and such vibrations are prevented from being transmitted to the playing unit 3.

Disk Ejection

When the playing of the disk D is finished, the ejection of the disk D is initiated when the disk D is gripped by the turntable 12 and the disk clamp 14 and the disk D is in a stationary position on the turntable 12. The pressuring arm 13 rotates in a direction away from the turntable 12 and the conveying roller 22 which had been in a position removed from the disk D displaces back to a position adjacent to the disk D. The disk D is then gripped by the disk guiding section 21 and the conveying roller 22. The disk D is conveyed to the disk insertion aperture and ejected outside the chassis by the rotations of the conveying roller 22. At this time, the playing unit base 11 is fixed by a cam plate (not shown).

The structure and operation of the disk device for use in a vehicle was outlined above. However each component will now be explained in detail below.

FIG. 2 is a plan view showing the horizontal operation of the mechanism of loading the disk D onto a turntable (not shown in FIG. 2) and ejecting the disk from the turntable in a conventional disk device. FIG. 3 is a lateral view of the right side of FIG. 2. In FIG. 2 and FIG. 3, 31 is a lever open member which is supported in the chassis 2 by a rotation shaft 32. 33 is a rocker arm which engages the long hole 33a with the pin 13e on the pressuring arm 13. An impelling force is provided by the springs 34 which are provided on both components.

35, 36 are a pair of lever stoppers one end of which is stacked and is pivotally supported by the shaft 37 which is provided on the pressuring arm 13. 38 is a lever rod. 39 is a slider rack (lever trigger).

Circular arc shaped long holes 13a, 13b, 13c, 13d are formed on the pressuring arm 13 respectively on the left and right about the axis 37. Pins 35a, 35b provided on the lever stopper 35 engage with long holes 13a, 13b, and pins 36a, 36b provided on the lever stopper 36 engage with long holes 13c, 13d. A lever rod 38 above is mounted on the pin 36a and the pin 36b engages with an indentation 38a. 40 is a spring which is mounted between the lever stoppers 35, 36 so that they are compressed towards each other. 41 is a spring which compresses one end of the lever rod 38 so that the lever rod is normally pushed in an abutting direction to the slide rack 39. 14 is a disk clamp which is mounted on the pressuring arm 13 so that it is positioned in the center of the chassis 2.

The operation of the invention will now be explained.

FIG. 4 shows a large diameter (12 cm) as loaded in the disk device. FIG. 5 shows the disk device immediately after the switching from the horizontal operation to the vertical operation due to the insertion of a disk D.

Firstly as shown in FIG. 2, when a disk D is inserted, the disk D is conveyed into the chassis 2 by a conveying roller (not shown). A pin 31a is pushed by the peripheral edge of the disk D during the conveying process, the lever open member 31 is rotated in a clockwise direction about the rotation shaft 32, and the rocker arm 33 is displaced in the direction of the arrow a by the projection 31b on the tip of the rocker arm 33.

Due to this displacement, since the engagement of the pin 35b with the engagement section 33b is released, the pins 35a, 35b displace along the long holes 13a, 13b and the pins 36a, 36b displace along the long holes 13c, 13d. This is because the pins 35a, 3a, 36b are pushed by the disk D due to the insertion of the disk D, as shown in FIG. 4 and FIG. 5. Thus the lever stopper 35, 36 rotates transversely about the axis 37.

When the disk D progresses further into the device, passes the position shown in FIG. 6 and is inserted into the position as shown in FIG. 7, the lever open member is rotated to an initial position by the spring force of the return spring 42 as a result of the widest section of the disk D being displaced. Furthermore the slider rack 39 is pushed in the direction of the arrow b by the lever rod 38, which is maximally rotated, through the pin 38b by the inserted disk D. Thus the switching operation from horizontal to vertical operations is completed.

As a result of the above switching, the slider rack 39 is pushed and displaced and a gear on the drive power source side engages with the rack of the slider rack 39. The drive power source further displaces the slider rack 39 in the direction of the arrow b. The slider lock is displaced together with this displacement and the pressuring arm 13 is displaced in the direction in which the disk D is locked. The lock of the playing unit 3 is released, the retraction of the conveying roller 22 from the disk D is performed in system and the loading operation of the disk is complete.

Furthermore when a disk D is ejected, the slider rack 39 is displaced in the direction c of the arrow by the reverse rotation of the drive power source. The switching operation from vertical operations to horizontal operations is performed by the lock of the disk D being released, the lock of the playing unit 3 being released, the clamp of the pressuring arm being released, and the slider rack 39 being returned to an initial position In horizontal operations, since the conveying roller 22 rotates in a reverse direction, the disk displaces to the position shown in FIG. 5 by passing through the position in FIG. 6 from the position shown in FIG. 7. The peripheral edge of the disk pushes the pin 31a and rotates the lever open member 31 in a clockwise direction and displaces the rocker arm 33 in the direction a of the arrow by the projection 31b on the tip of the rocker arm 33. Since the engagement of the pin 35b with the engagement section 33b is released as a result of the displacement, the lever stoppers 35, 36 are rotated in an approaching direction due to the compression of the spring 40. Thus the disk D is ejected and the device returns to an initial state as shown in FIG. 2.

FIG. 8 and FIG. 9 show the loaded position of a small diameter (8 cm) disk D. The small diameter disk D does not operate at all on the lever open member 31. As a result, the rocker arm 33 and the lever stoppers 35, 36 do not operate. The edge of the inserted disk D directly operates on the pin 38b of the lever rod 38 as shown in FIG. 8 and the lever rod 38 is rotated in a clockwise direction about the pin 36a through the pin 36b. As shown in FIG. 9, the slider rack 39 is pushed in the direction of the arrow b by the lever rod 38 and the switching operation from horizontal to vertical operations is completed. Thereafter the vertical operation is performed as above and the disk loading is complete. Furthermore when the vertical and horizontal operations are performed in the reverse manner, a disk ejection operation is completed.

Since the conventional device is constructed as above, both types of disk, large (12 cm) and small (8 cm) are switched by the same member (lever rod). Thus the relationship of the pin 36a (support point), the point of abutment between with the slider rack 39 of the lever rod 38 (operation point) and the pin 38b (force point) becomes the same and so the switching operation must be operated with the same timing. Thus there is no freedom in setting components. As a result, it is difficult to increase the movement accuracy of the disk.

The present invention is proposed to solve the above problems and has the object of providing respective switching timings for large and small disks as well as improving the switching accuracy from a horizontal operation to a vertical operation.

Furthermore it is an object of the present invention to enable returning the disk stopper accurately to an initial position and thus reduce load when the disk is loaded.

DISCLOSURE OF THE INVENTION

The device of the present invention comprises a disk device which loads a disk onto a turntable by a conveying roller and which ejects the disk from the turntable. The device comprises a lever open member which rotates due to abutting with a large diameter disk, a disk stopper which is displaced in the direction of disk loading by abutting with a disk, a lever stopper which engages and rotates with a disk stopper, a cam stopper which engages and rotates with the lever stopper when a small diameter disk is inserted, and which, when a large diameter disk is inserted, is pushed by the lever open member, releases the engagement with the lever stopper and which becomes relatively displaceable and which rotates on being directly pushed by the lever open member and a slider rack which conducts switching when pushed by a cam stopper.

By such an arrangement, when loading a large diameter disk, the engagement of the lever stopper and the cam stopper is released by the lever open member which is rotated by the disk. The direct cam stopper is rotated by the disk and switching is performed. When loading a small diameter disk, it is possible to improve the accuracy of the switching operation and set respective switching timing for the two kinds of respectively sized disks by performing the switching by rotating the cam stopper with which the lever stopper is rotatably engaged by the displacement of the disk stopper resulting from the insertion of the disk.

The disk device of the present invention provides a stopper pin so that the cam stopper which is pushed by the lever open member rotates the lever stopper to near an initial position. Furthermore a spring is provided between the arm clamper and the lever stopper which is compressed onto the lever stopper in the disk loading and ejection processes and which rotates in the opposite direction to the disk loading and ejection.

By such a structure, it is possible to accurately return the disk stopper to an initial position and to reduce the load when a disk is loaded.

BRIEF DESCRIPTION OF THE DRAWINGS

FIG. 13 is a plan view and lateral view respectively showing each arrangement.

EXPLANATION OF THE PREFERRED EMBODIMENTS

In order to explain the present invention in more detail, the preferred embodiments will be explained with reference to the accompanying figures.

Embodiment 1

Figure 1:
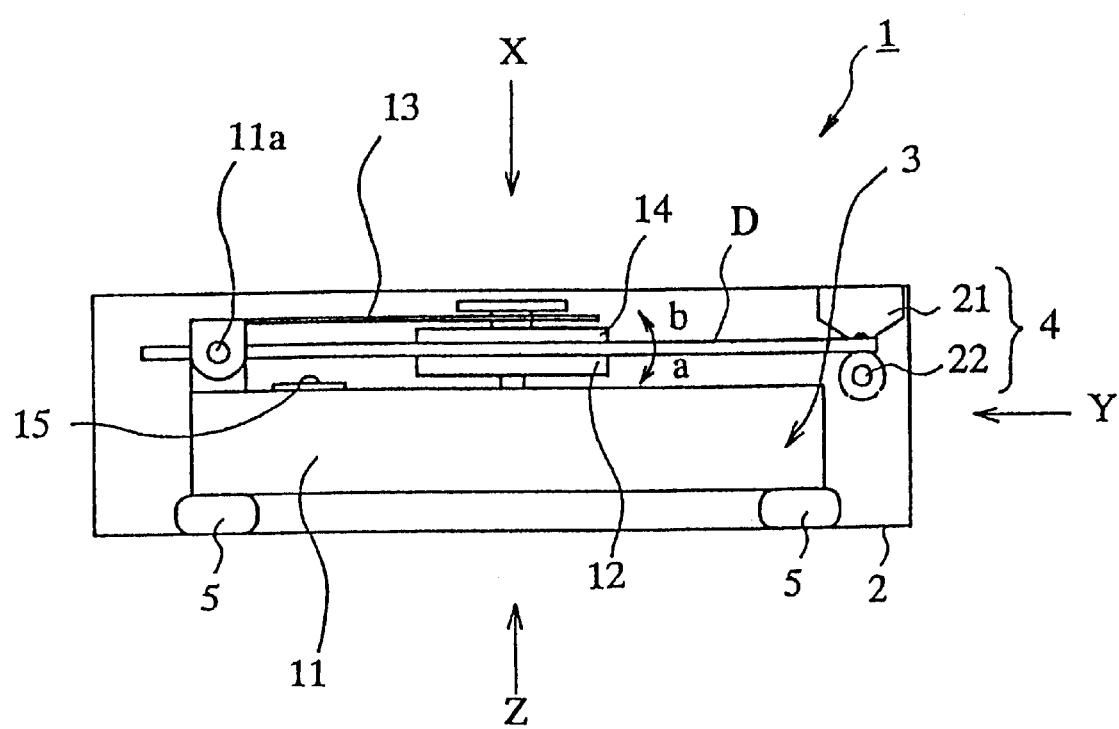
FIG. 1 is a schematic diagram of a disk device for use in a vehicle.
Figure 2:
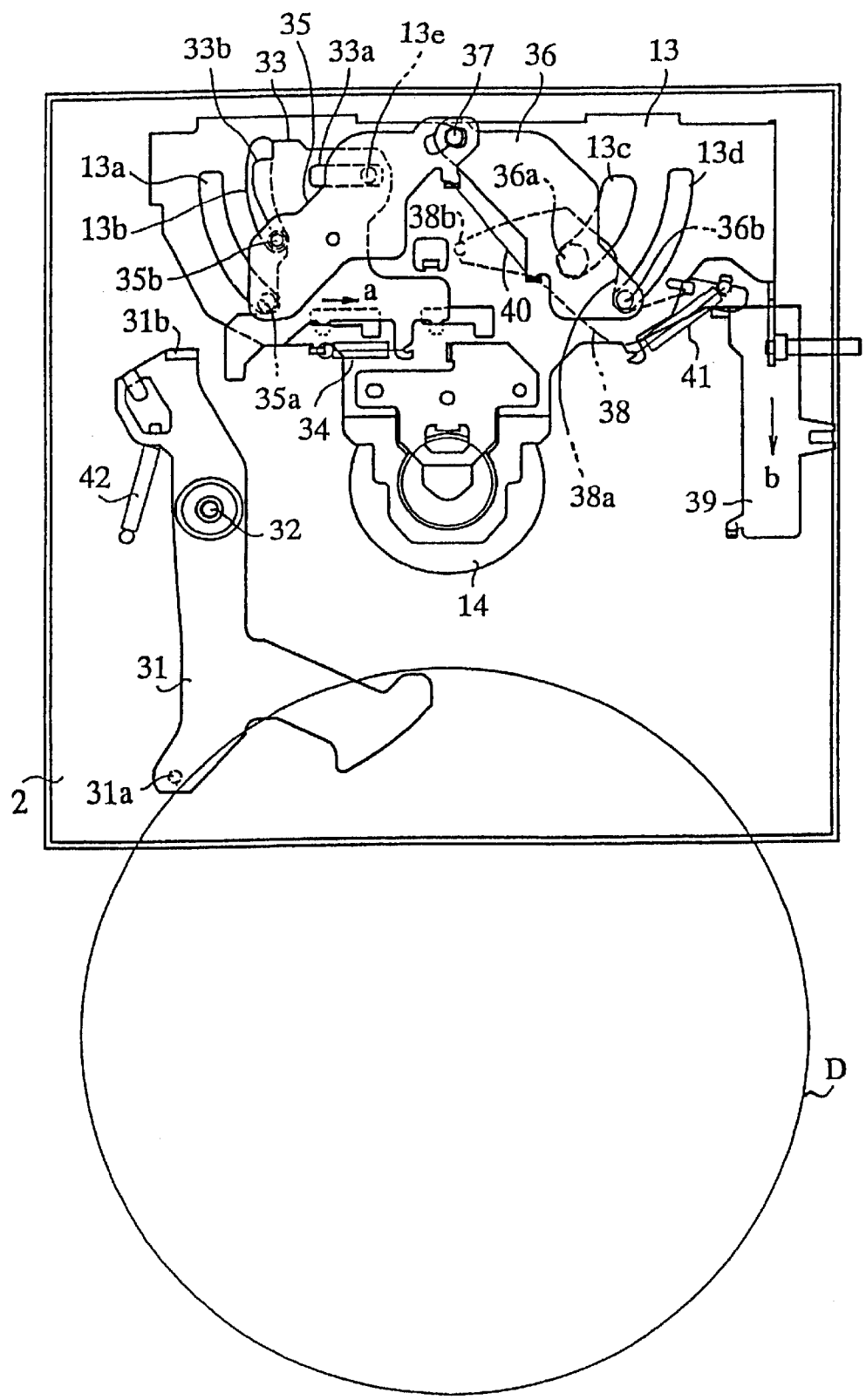
FIG. 2 is a is a plan view of the horizontal operation mechanism which loads a disk onto a turntable and which ejects a disk from the turntable according to a conventional disk device.
Figure 3:
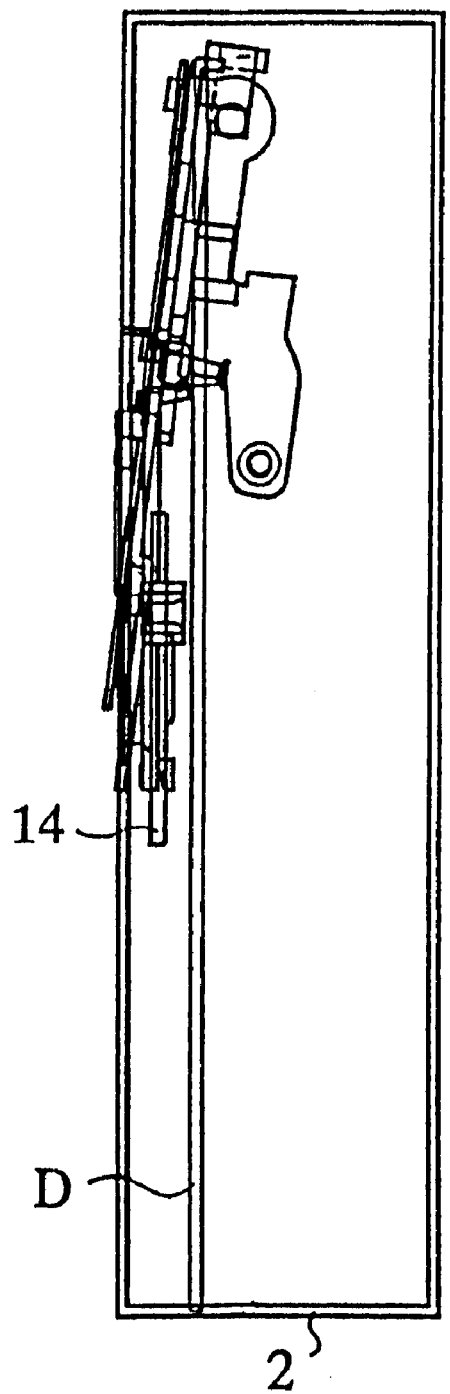
FIG. 3 is a right-side lateral view of FIG. 2.
Figure 4:
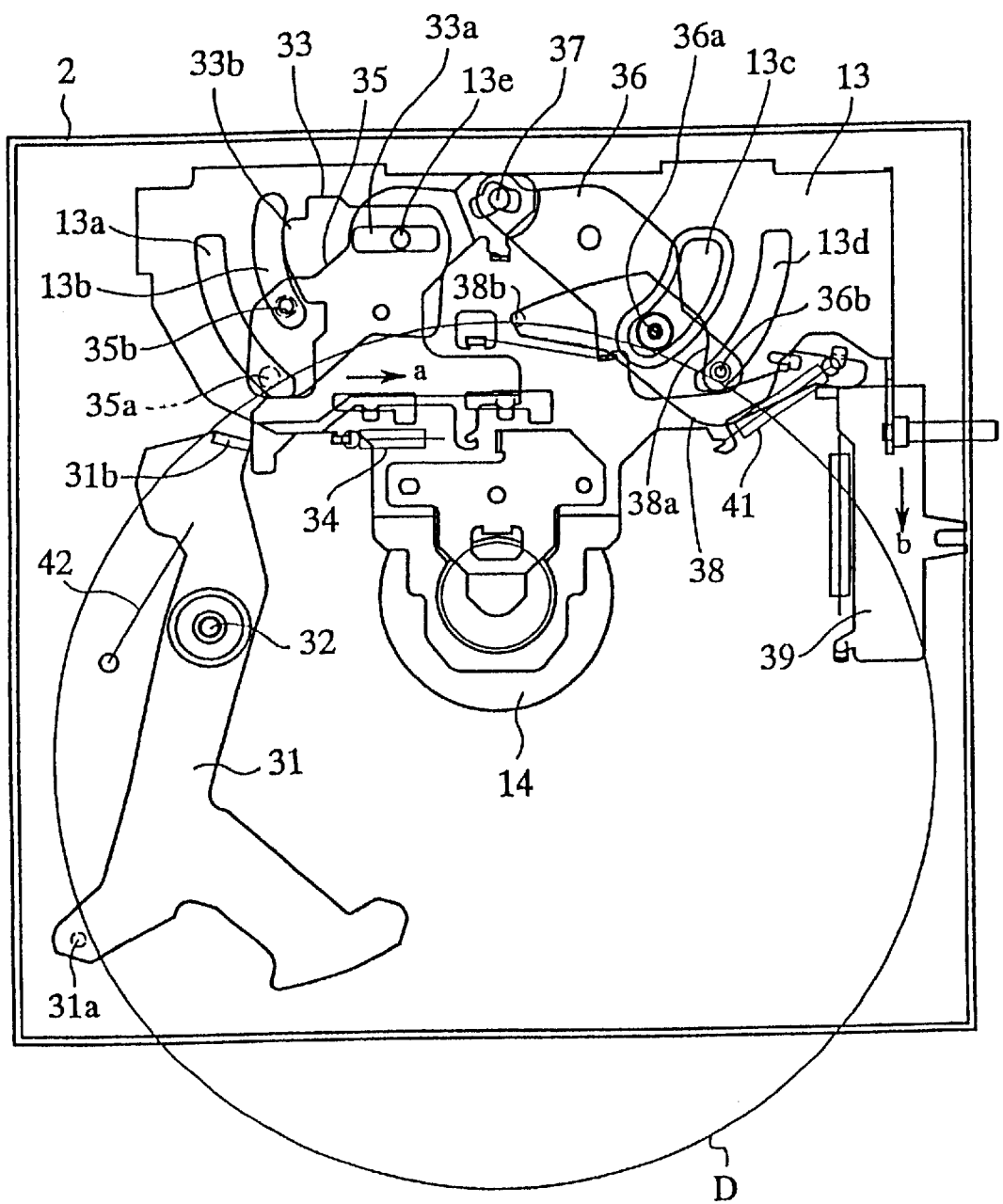
FIG. 4 is a view of a large diameter disk as loaded.
Figure 5:
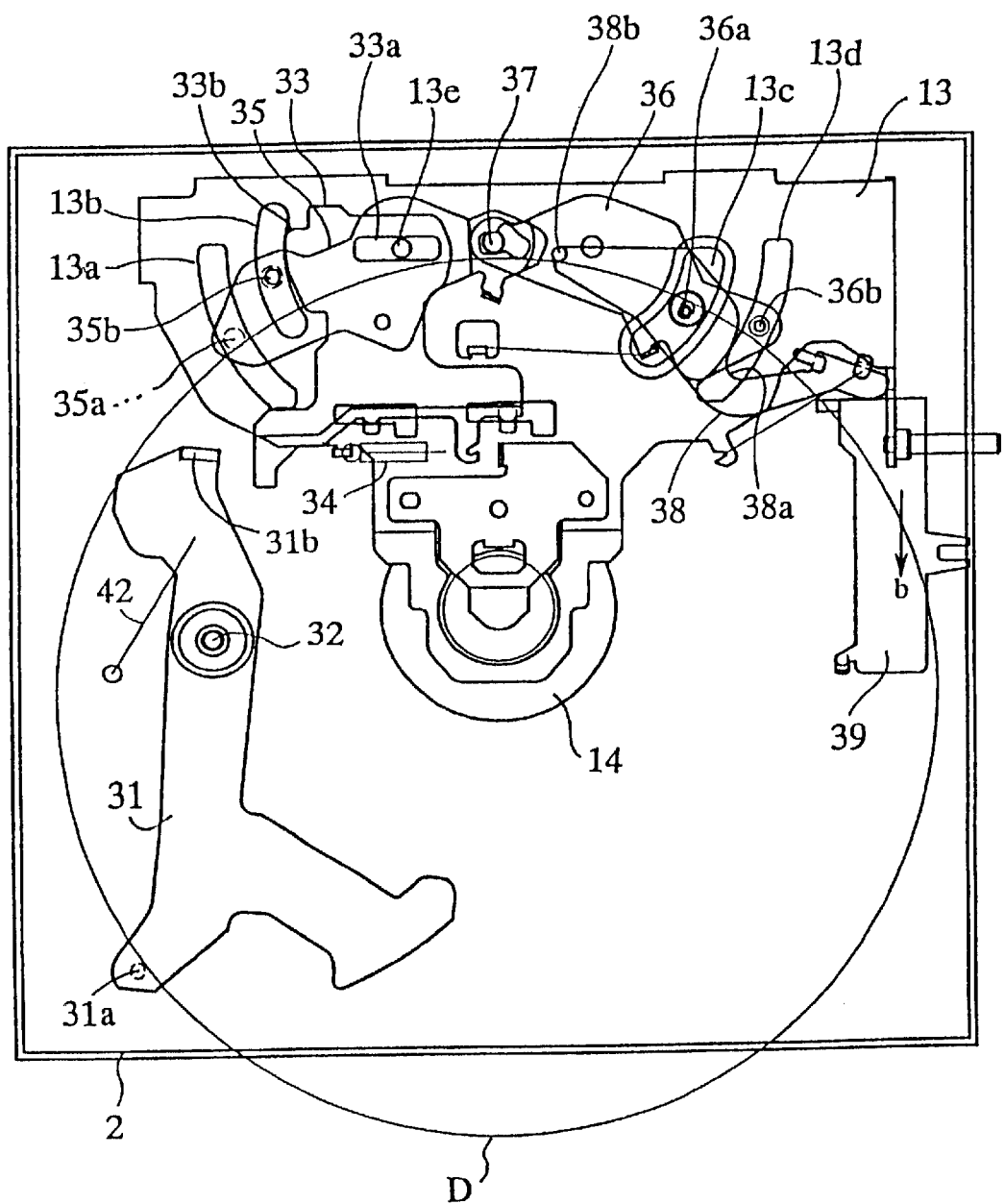
FIG. 5 shows the situation when the loading of a disk is slightly more progressed than in FIG. 4.
Figure 6:
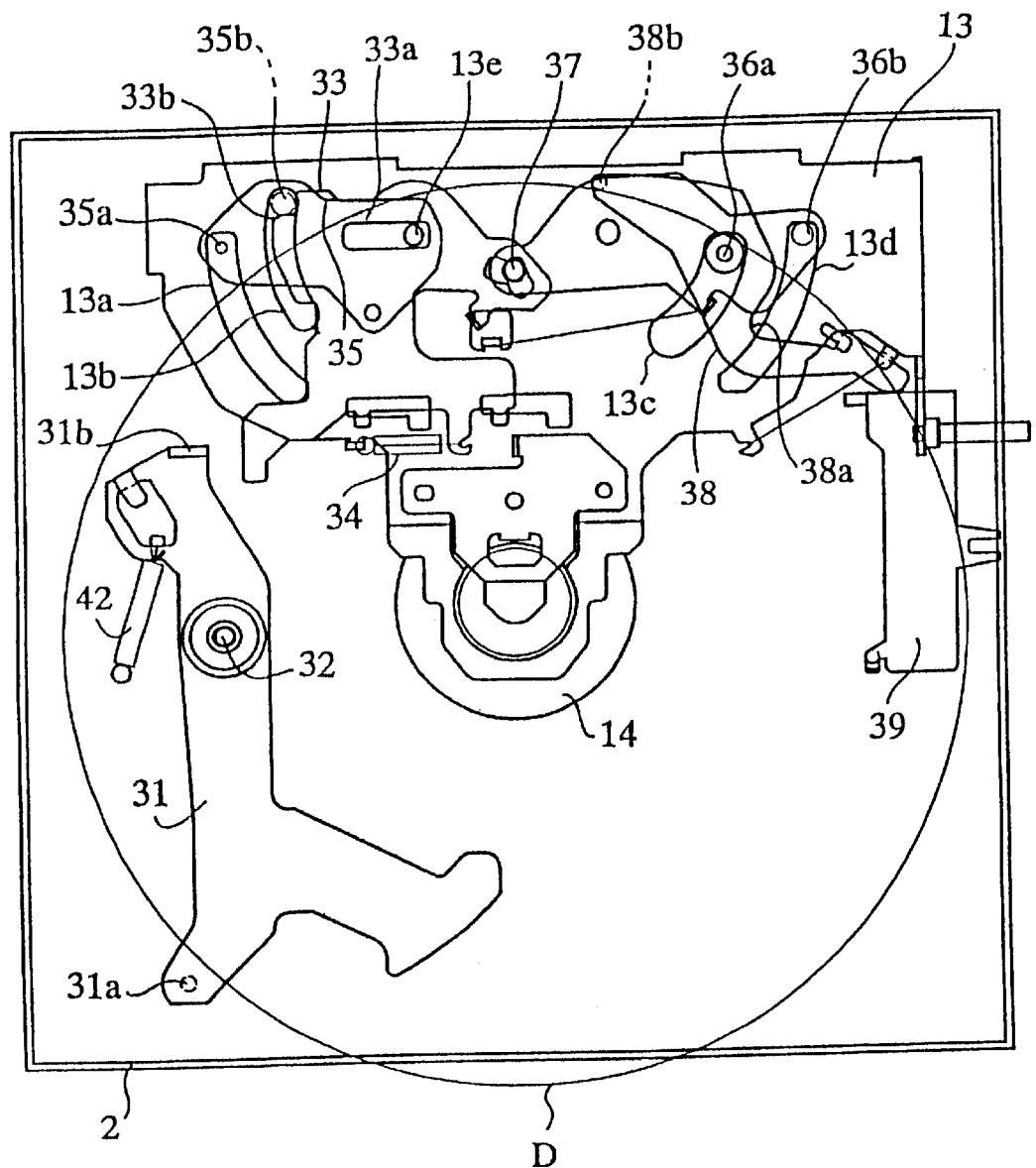
FIG. 6 shows the switching operation from horizontal to vertical operation due to the insertion of a disk.
Figure 7:
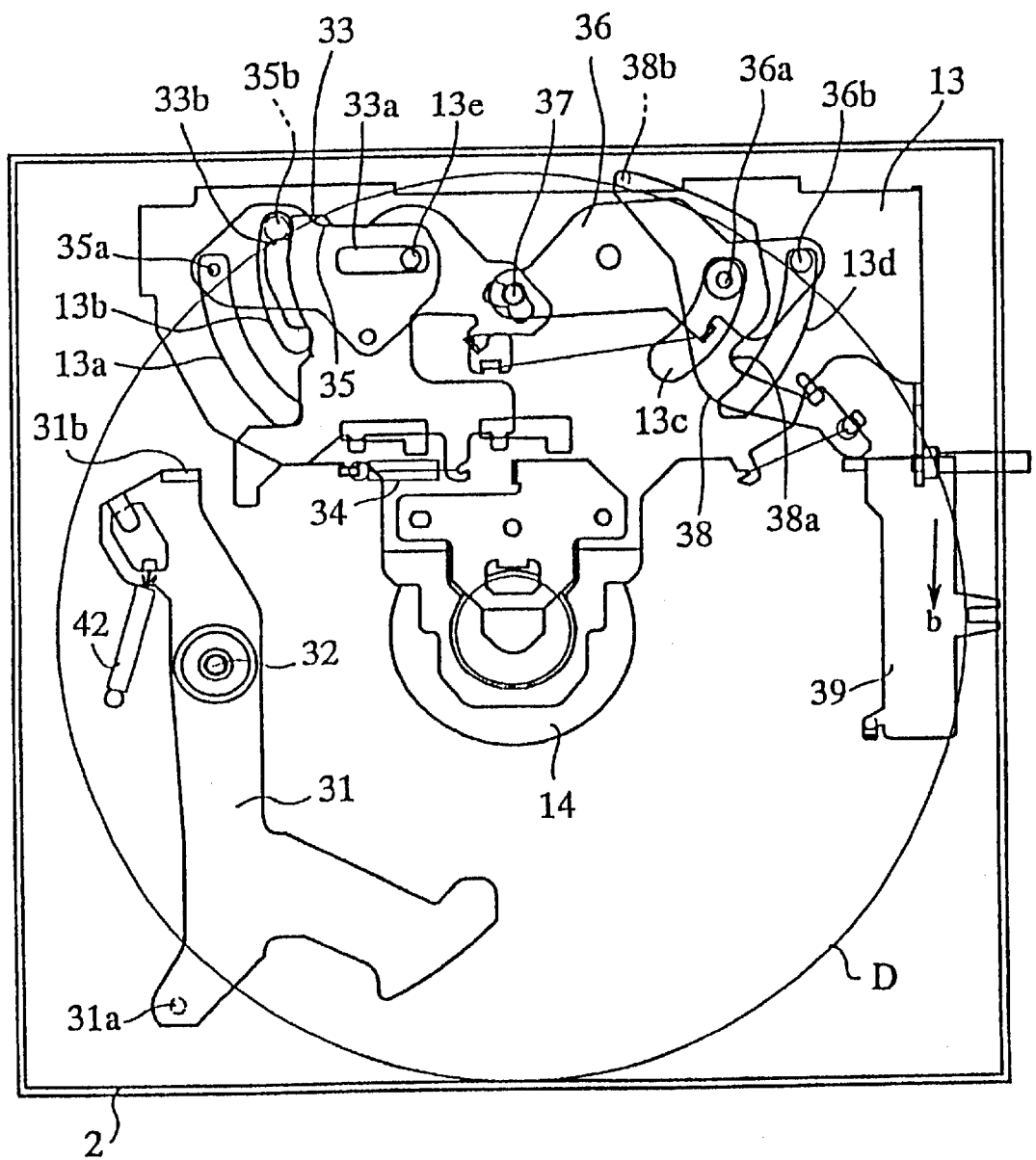
FIG. 7 is a view immediately after the switching due to the vertical operational mechanism.
Figure 8:
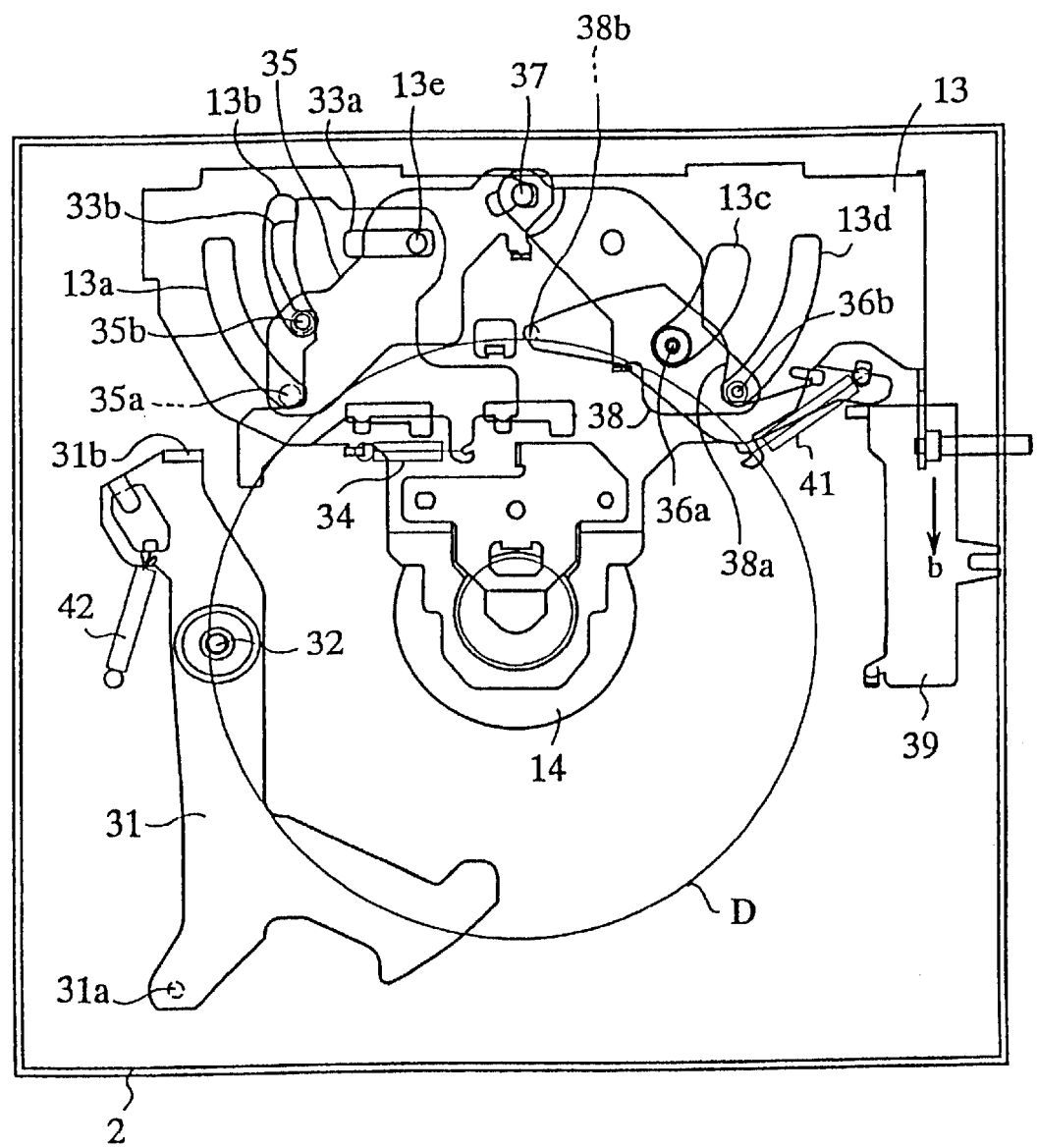
FIG. 8 is a view of a small diameter disk as loaded.
Figure 9:
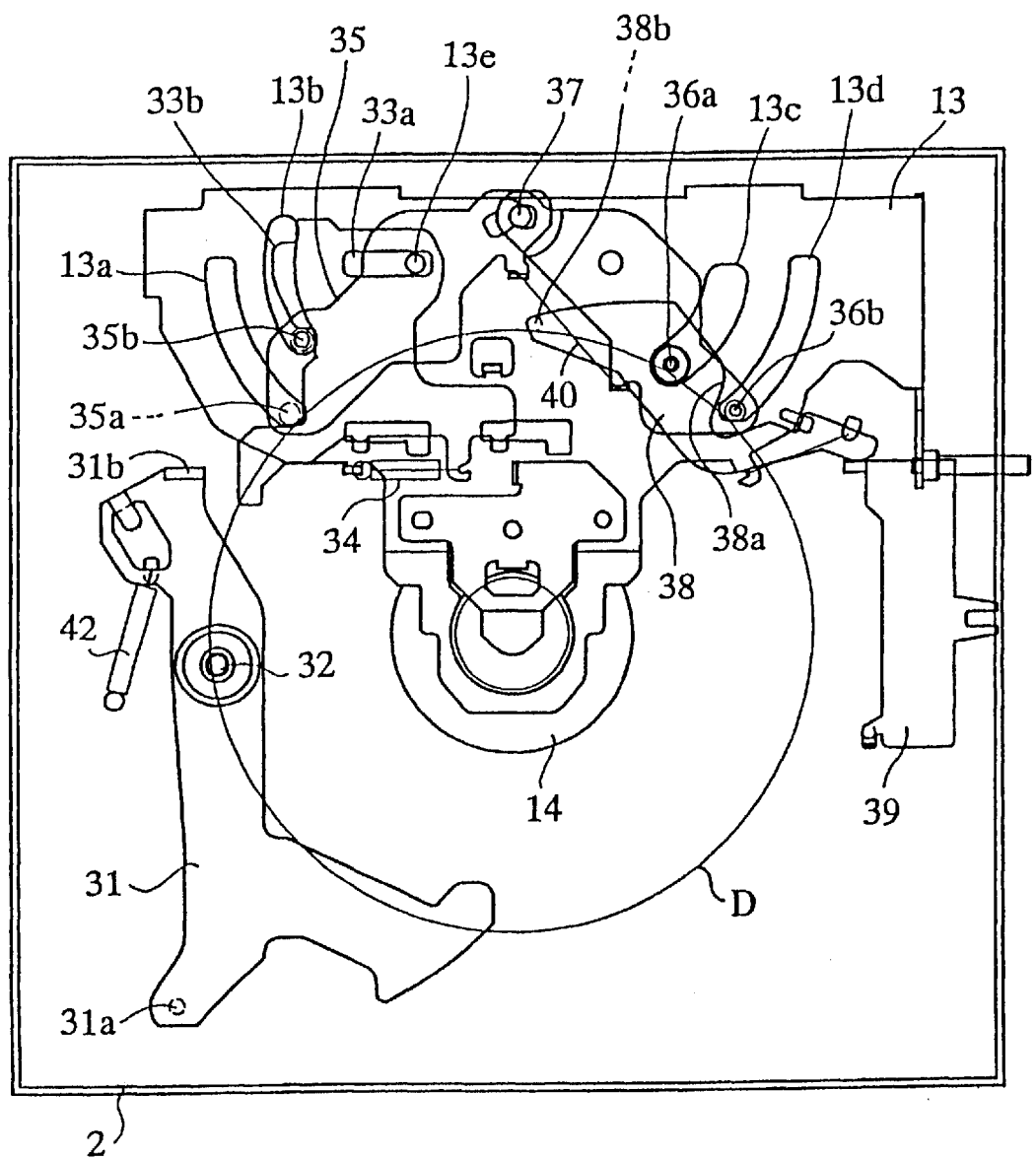
FIG. 9 is a view immediately after the switching mechanism due to the insertion of a small diameter disk.
Figure 10:
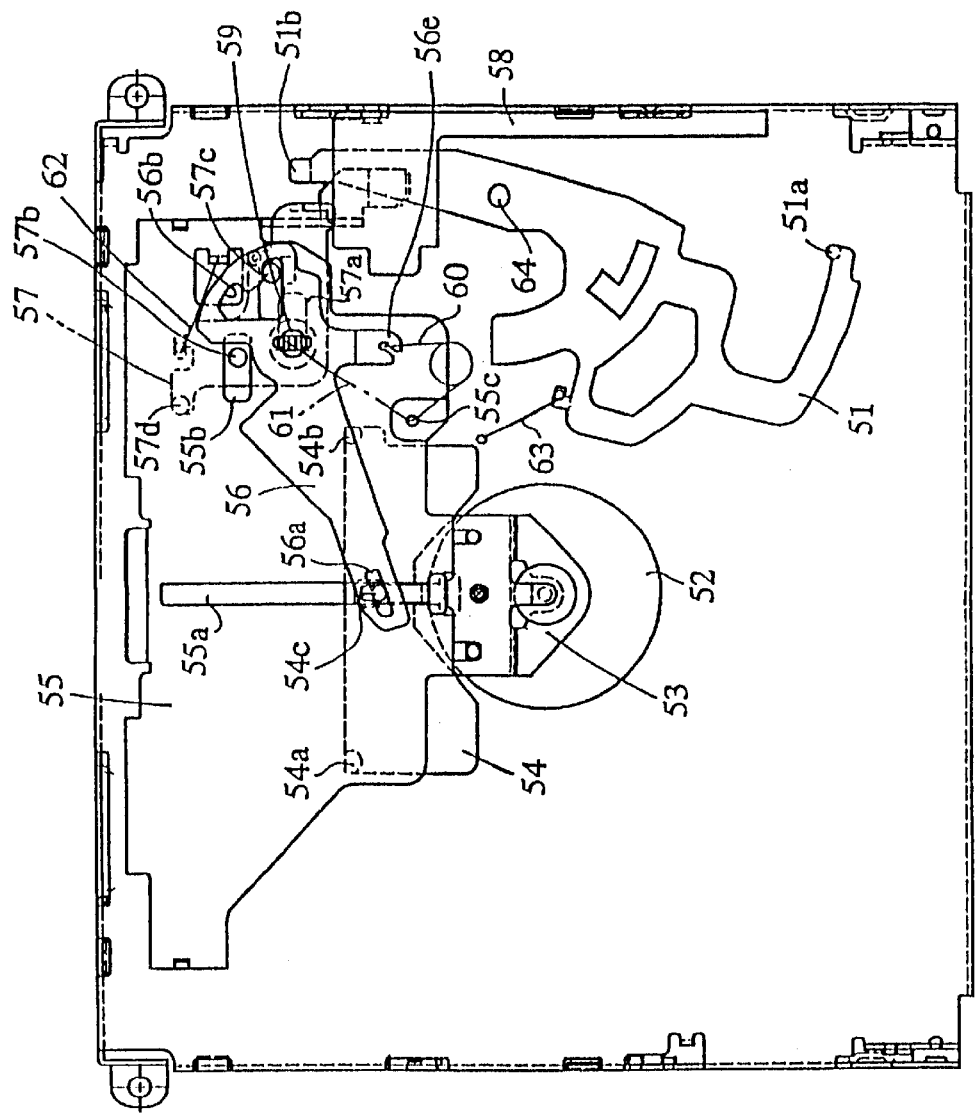
FIG. 10 is a is a plan view of the horizontal operation mechanism which loads a disk onto a turntable and ejects a disk from the turntable according to a first embodiment of the present invention.
Figure 11:
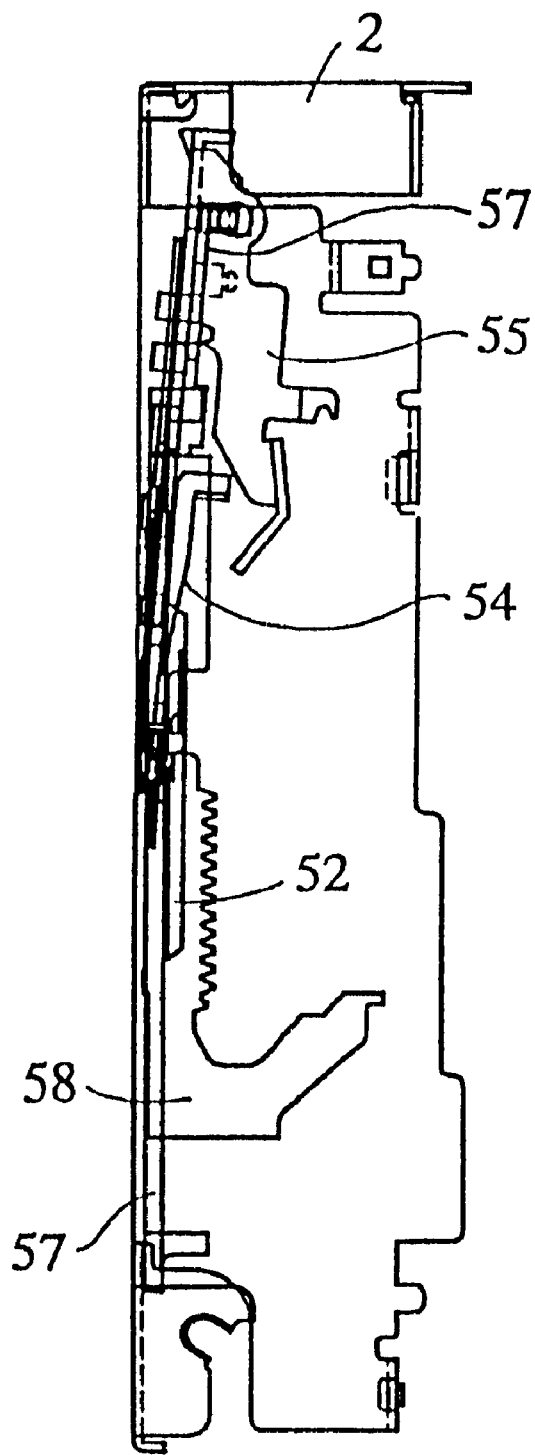
FIG. 11 is a right-hand lateral view of FIG. 10.
Figure 12:
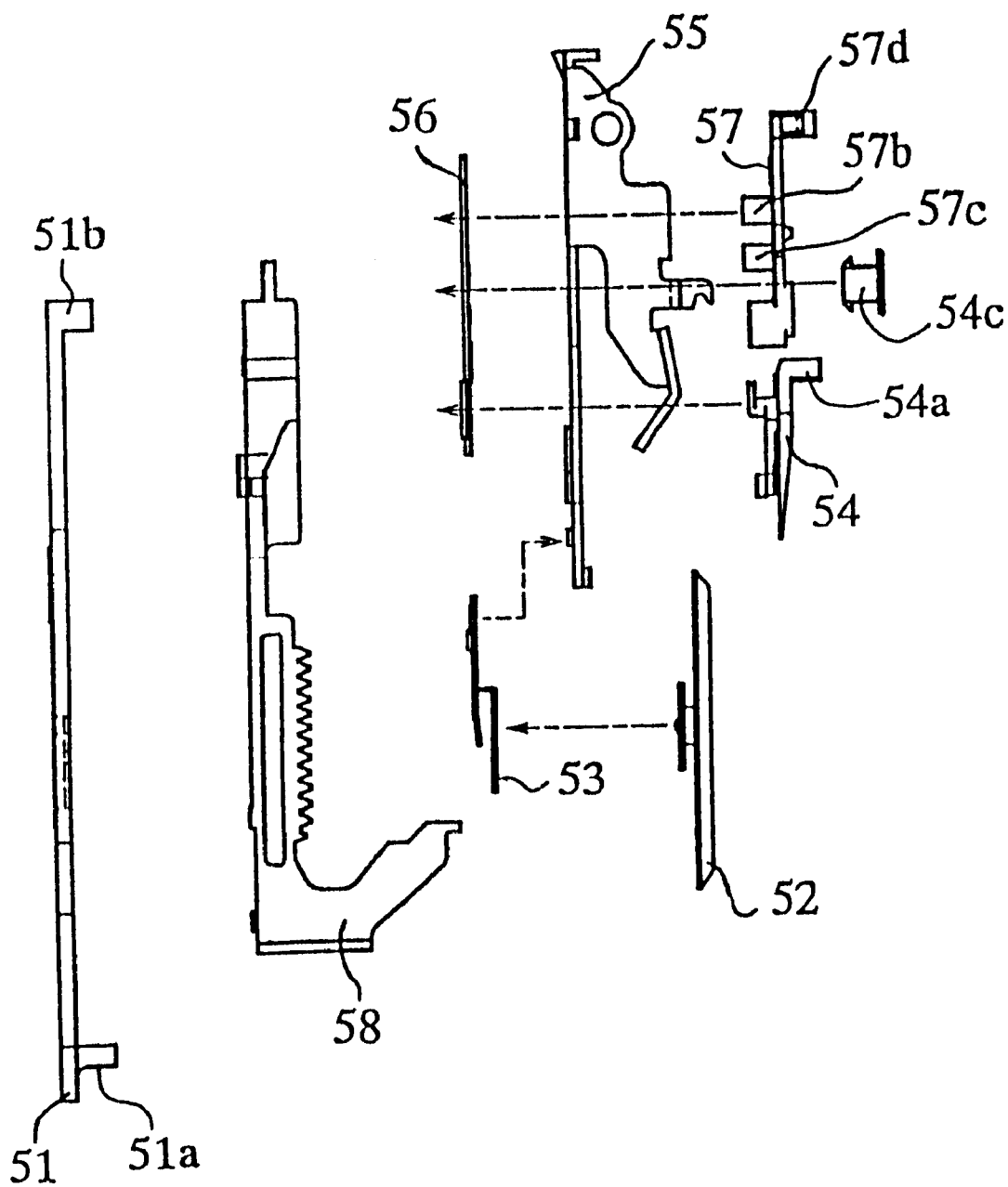
FIG. 12 is a right-hand lateral view showing an exploded view of each arrangement of FIG. 11.

FIG. 10 is a is a plan view of the horizontal operation mechanism which loads a disk onto a turntable and ejects a disk from the turntable according to a first embodiment of the present invention. FIG. 11 is a right-hand lateral view of FIG. 10. FIG. 12 is a right-hand lateral view showing an exploded view of each component of FIG. 11. FIG. 13 is a plan view and lateral view respectively showing each component. In FIGS. 10 to 13, 51 is a lever open member, 52 is a clamp, 53 is a clamp cap which mounts the clamp 52, 54 is a slider stopper, 55 is a arm clamper, 56 is a lever stopper, 57 is a cam stopper, 58 is a slider rack, and 59 is a hook stopper.

The central section of the lever open member 51 above is supported by a shaft so as to be rotatable in the chassis. A pin 51a is provided on one end which abuts with the disk edge and a projection 51b is provided on the other end. The slider stopper 54 has pins 54a, 54b on the left and right of the corner end sections with which the disk D abuts. The slider stopper 54 is engaged so as to be displaceable with the long hole 55a, which is provided in the direction of disk ejection in the arm clamper 55, due to the engaging section 54c provided in its center. The lever stopper 56 and the cam stopper 57 are supported in relative rotation by the hook stopper 59. The lever stopper 56 is supported by and engages with the engaging section 54c of the slider stopper 54 due to the long hole 56a which is provided at one end.

Apart from the long hole 57a which passes through the cam stopper 57, one side of the cam stopper 57 has a pin 57b which engages with the engaging hole 55b of the arm clamper 55 and a pin 57c which engages with the engaging hole 56b of the lever stopper 56. On the other side of the cam stopper 57, there is a pin 57d which abuts with the disk D. 60 is a spring which is provided between the arm clamper 55 and the cam stopper 57. The direction in which the spring 60 is compressed with respect to the cam stopper 57 is reversed by the cam stopper 57 rotating so that the mounting point 55c of the spring 60 exceeds the line 61 connecting the mounting point 55c and the hook stopper 59. 62 is a spring provided between the arm clamper 55 and the cam stopper 57 so that a rotational force in a clockwise direction is applied to the cam stopper 57. 63 is a return spring of the lever open member 51.

The operation of the invention will be explained below.

Figure 14:
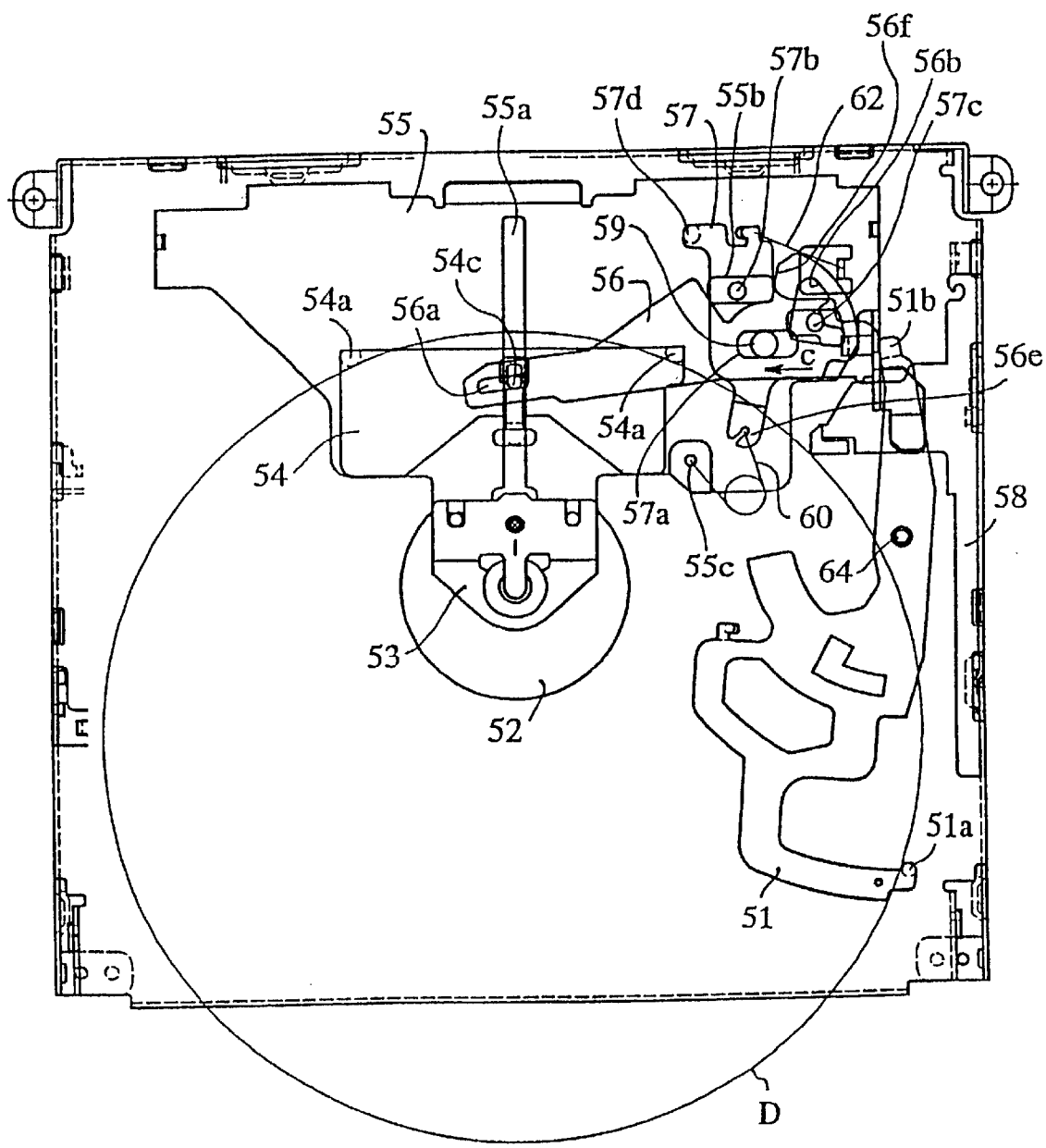
FIG. 14 shows a large diameter disk as loaded.
Figure 15:
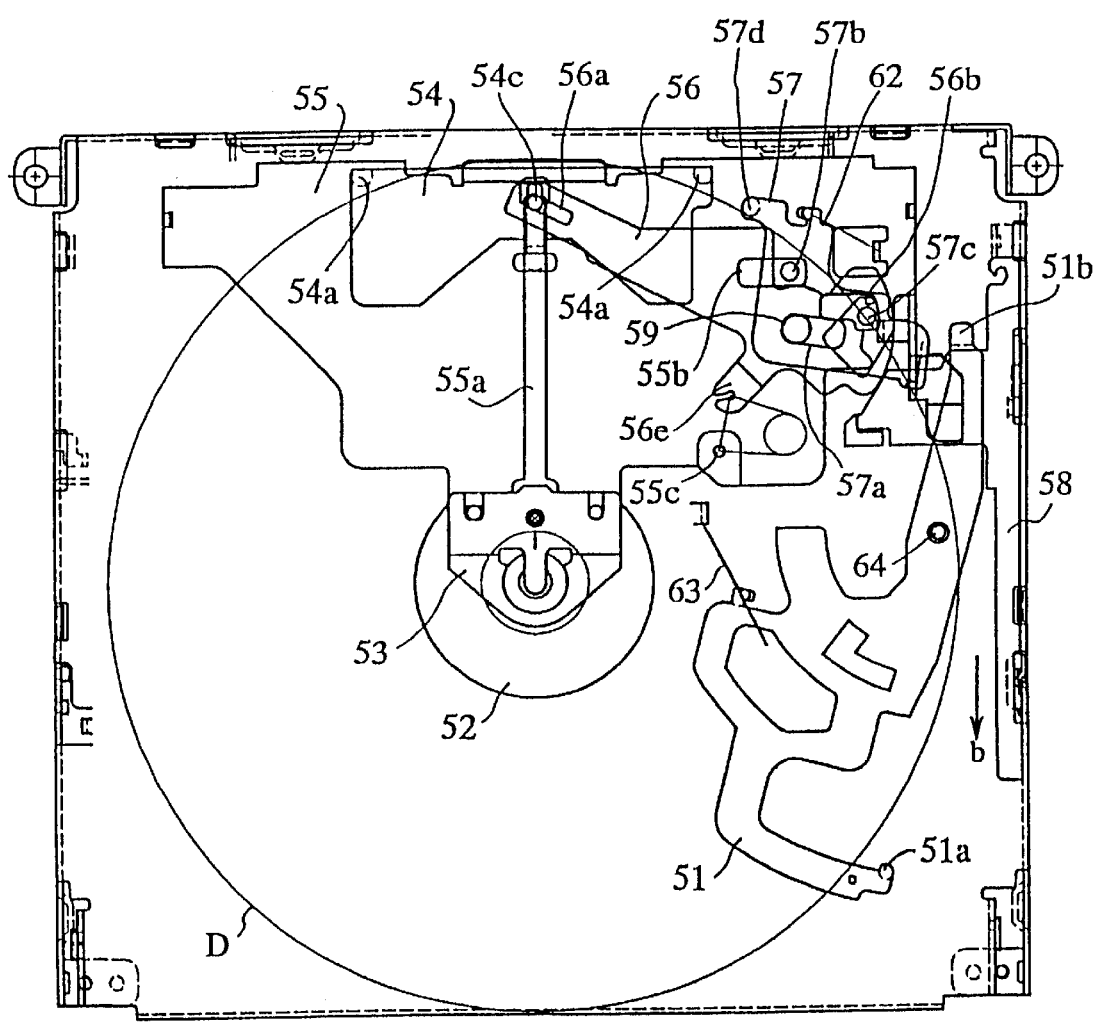
FIG. 15 shows the situation immediately after switching to vertical operations due to the insertion of a large diameter disk.

FIG. 14 shows a large diameter disk as loaded. FIG. 15 shows the situation immediately after switching to vertical operations due to the insertion of a large diameter disk.

Firstly shown in FIG. 14, when a disk D is inserted, the pin 51a is pushed by the edge of the disk D, the lever open member 51 is rotated in an anti-clockwise direction, and the cam stopper 57 is displaced in the direction c of the arrow by the projection 51b on the tip of the lever open member 51. As a result of this displacement, the engagement of the pin 57c in the cam stopper 57 and the engaging wall 56b of the lever stopper 56 is released. As a result, the slider stopper 54 is pushed by the disk D and rotates in the direction of disk D loading. Even if the lever stop 56 rotates, that rotational force is not transmitted to the cam stopper 57. As a result, the disk D is loaded up to a fixed position, and presses directly on the pin 57d. Thus due to the fact that the cam stopper 57 is rotated, the slider rack 58 is pushed in the direction b of the arrow by the rotated cam stopper 57 and the switching operation as shown in FIG. 15 is completed.

As a result of the above switching operation, the slider rack 58 is pushed and displaced. A gear on the side of the source of motive power engages with the rack of the slider rack 58 and thus the slider rack 58 is further displaced in the direction b of the arrow by the source of motive power. A slider lock (not shown) is displaced together in this displacement process and the arm clamper 55 is displaced in a direction in which the disk D is gripped. The lock of the playing unit is released and the conveying roller separates from the disk and so completes the loading operation of the disk D.

Furthermore when a disk D is ejected, the slider rack 58 is displaced in the direction d of the arrow by the source of motive power rotating in the reverse direction. The lock of the playing unit is released and the clamp of the arm clamper 55 is released. The slider rack 58 returns to an initial position and the switching from horizontal to vertical operations is completed.

The operation of the vertical mechanism will not be described in detail as a variety of mechanisms which are employed in the prior art may be used.

Figure 16:
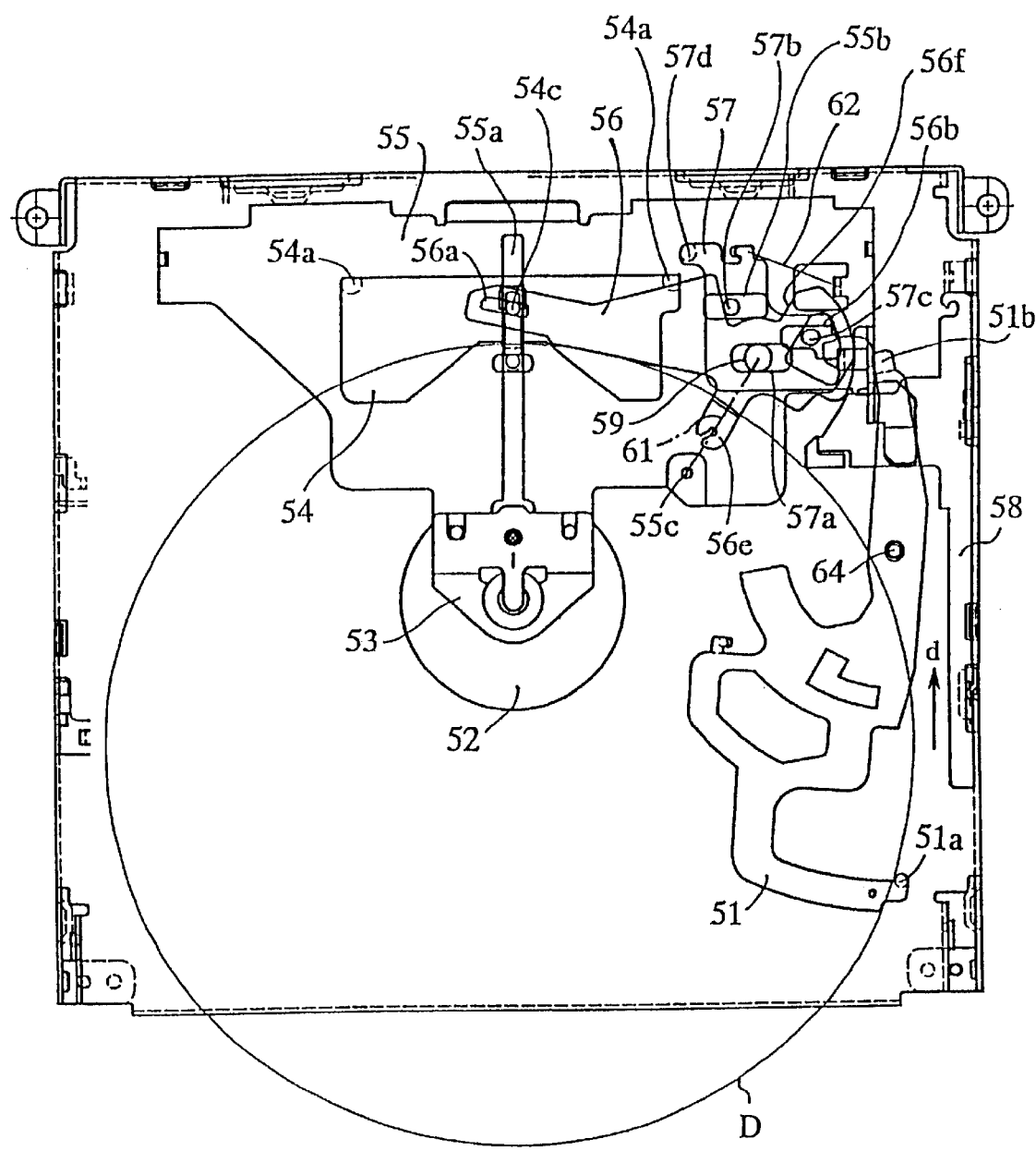
FIG. 16 shows the device during disk ejection.

When switching from vertical to horizontal operations, as shown in FIG. 16 the disk D is displaced in the direction of ejection by the conveying roller which rotates in the reverse direction to when a disk is inserted. The edge of the disk D pushes the pin 51a and rotates the lever open member 51 in an anti-clockwise direction. The cam stopper 57 is displaced in the direction c of the arrow by the projection 51b on the tip of the lever open member 51. The pin 57c of the cam stopper 57 pushes the end face of the lever stopper 56 due to this displacement and the lever stopper 56 is rotated in an anti-clockwise direction. The force of the spring 60 displaces from a direction of insertion to a direction of ejection when the spring mounting point 56e of the lever stopper 56 exceeds the line 61 joining the mounting point 55c on the arm clamper side and the hook stopper 59. Thus the lever stopper 56 is rotates to an initial position. Furthermore the slider stopper 54 which is engaged with the lever stopper 56 displaces together to an initial position.

Figure 17:
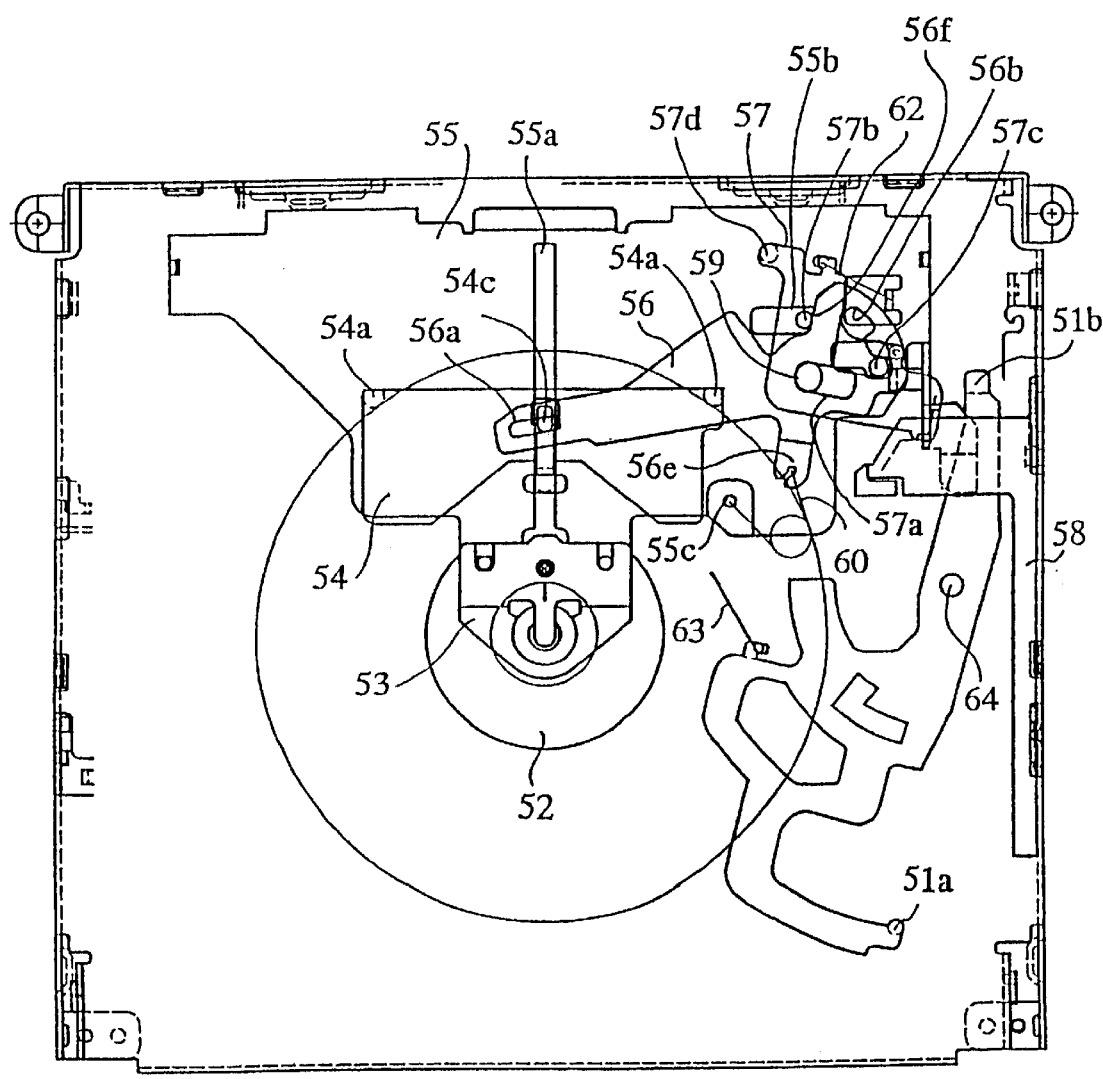
FIG. 17 shows the switching mechanism when switching is performed by a small diameter disk.

FIG. 17 shows the switching operation when a small diameter disk (8 cm) is loaded. The small diameter disk D does not operate at all on the lever open member 51 when the disk D and the slider stopper 54 abut during disk insertion or ejection. Thus the engagement of the pin 57c of the cam stopper 57 and the engaging hole 56b of the lever stopper 56 is maintained. In this state, when the slider stopper 54 displaces in the direction of loading together with the insertion of a disk D, the lever stopper 56 rotates in a clockwise direction. The slider rack 58 is pushed to a fixed position by the cam stopper 57 which is engaged with and rotates together with the lever stopper 56 and the switching operation is completed.

At this time, since the 8 cm disk is correctly placed on the center of the turntable, the pin 57c of the cam stopper 57 abuts with an end face of the groove 55d of the arm clamper 55. The rotation of the cam stopper 57 is terminated and the lever stopper 56 ceases rotating in an anti-clockwise direction due to the abutment of the pin 57c of the cam stopper 57 with the end face 56f of the lever stopper (the lever stopper rotates in an anti-clockwise direction due to the spring).

By the arrangement above, extra time needed to synchronize the rotation of the cam stopper 57 and the lever stopper 56 is eliminated. In this way, it is possible to determine a fixed position for the slider stopper 54.

On the other hand, when a loaded disk D is removed, the slider stopper 54 displaces together in the direction of ejection of a disk D due to the force of the spring 60 as a result of the displacement in the direction of ejecting the disk D. The lever stopper 56 rotates and returns to an initial position as shown in FIG. 10.

As shown above, according to embodiment 1, when a large diameter disk is inserted, the synchronized rotation and engagement of the lever stopper 56 and the cam stopper 57 due to the lever open member 51, which is rotated by the disk D, is released. The direct cam stopper 57 is rotated by the disk and thus the switching operation is performed. When a small diameter disk is inserted, the switching operation is performed by rotating the cam stopper 57 which is engaged with and rotates in synchrony with the lever stopper 56 by the displacement of the arm clamper 55 together with the insertion of the disk D. Thus it is possible to perform respective switching operations for disks D of two different sizes by respective members. As a result, it is possible to freely set the switching timing of the two differently sized disks by the respectively different members and so improve switching accuracy.

Furthermore according to embodiment 1, pins 57b, 57c are provided on the cam stopper 57 in order to rotate the lever stopper 56 before disk ejection to near an initial position. Thus it is possible to accurately return the slider stopper 54 to an initial position and reduce the load during disk loading operations by the provision of a spring 60, the force of which operates on the cam stopper 57 in the process of disk D loading and which rotates in the reverse direction to disk insertion and ejection.

INDUSTRIAL APPLICATION

As shown above, the device of the present invention is adapted for use with a disk device for use in a vehicle and which can use disks of two different sizes.

What is claimed is:

1. A disk device which loads a disk onto a turntable by a conveying roller and which ejects a disk from a turntable, said disk device comprising:

a lever open member which rotates due to abutting with a large diameter disk;

a slider stopper which is displaced in a direction of disk loading by abutting with one of the large diameter disk and a small diameter disk;

a lever stopper which engages with said slider stopper, and which is rotatable relative to said slider stopper;

a cam stopper (1) which engages and rotates together with said lever stopper when the small diameter disk is inserted, and (2) which, when the large diameter disk is inserted, is pushed by said lever open member, releases the engagement with said lever stopper, becomes relatively displaceable and rotates by being directly pushed by the large diameter disk; and a slider rack which conducts switching when pushed by said cam stopper.

2. A disk device as defined by claim 1, further comprising:

a pin provided on said cam stopper so as to rotate said lever stopper by said cam stopper; and a spring provided between an arm clamper and said lever stopper.

\* \* \* \* \*